(12) United States Patent
Erdmann et al.

(10) Patent No.: US 10,682,600 B2
(45) Date of Patent: Jun. 16, 2020

(54) APPARATUS FOR CLEANING CRANKCASE GASES

(71) Applicants: REINZ-DICHTUNGS-GMBH, Neu-Ulm (DE); 3NINE AB, Nacka Strand (SE)

(72) Inventors: Christoph Erdmann, Ulm (DE); Francesco Zitarosa, Illertissen (DE); Claes Inge, Nacka (SE); Peter Franzen, Bandhagen (SE)

(73) Assignee: 3NINE AB, Nacka Strand (SE)

( * ) Notice: Subject to any disclaimer, the term of this patent is extended or adjusted under 35 U.S.C. 154(b) by 156 days.

(21) Appl. No.: 15/575,914

(22) PCT Filed: May 25, 2016

(86) PCT No.: PCT/EP2016/061850
§ 371 (c)(1),
(2) Date: Nov. 21, 2017

(87) PCT Pub. No.: WO2016/189060
PCT Pub. Date: Dec. 1, 2016

(65) Prior Publication Data
US 2018/0147515 A1    May 31, 2018

(30) Foreign Application Priority Data

May 27, 2015  (SE) ...................... 1550684

(51) Int. Cl.
*B01D 45/00*   (2006.01)
*B01D 45/14*   (2006.01)
(Continued)

(52) U.S. Cl.
CPC ............. *B01D 45/14* (2013.01); *B01D 45/08* (2013.01); *B04B 5/005* (2013.01); *B04B 5/08* (2013.01);
(Continued)

(58) Field of Classification Search
CPC ...... B01D 45/14; B01D 45/08; B01D 21/262; B04B 5/08; B04B 9/06; B04B 5/12;
(Continued)

(56) References Cited

U.S. PATENT DOCUMENTS 4,118,207 A  * 10/1978  Wilhelm ................ B01D 45/14
                                                        55/338
4,373,941 A  *  2/1983  Lagelbauer ............ B01D 45/14
                                                        55/401
(Continued)

FOREIGN PATENT DOCUMENTS

CN      103889583 A    6/2014
DE         4237128 A1   1/1994
(Continued)

OTHER PUBLICATIONS

European Patent Office, International Search Report with Written Opinion issued in PCT/EP2016/061850, dated Aug. 18, 2016, 9 pages, European Patent Office, Rijswijk, Netherlands.
(Continued)

*Primary Examiner* — Dung H Bui
(74) *Attorney, Agent, or Firm* — Mark P. Stone

(57) ABSTRACT

A rotor-type apparatus for centrifugal cleaning of crankcase gases from a combustion engine. The rotor is hydraulically driven by pressurized oil by means of a turbine wheel located in an oil collection chamber. A pressure equalizing and gas discharging conduit, which extends into the collection chamber and has an upper aperture located above a liquid level of the oil in the collection chamber during the operation, is connected to an outlet conduit for the propellant oil from the collection chamber.

19 Claims, 5 Drawing Sheets

Figure 1:
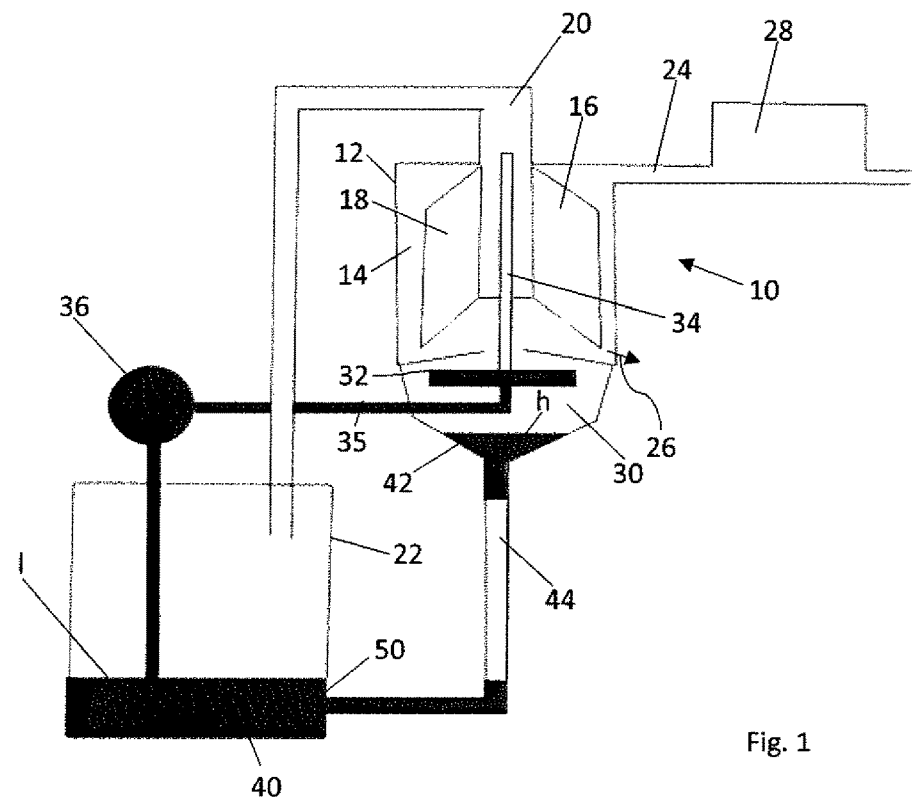

(51) Int. Cl.
  *B04B 5/00* (2006.01)
  *B04B 5/12* (2006.01)
  *B04B 9/06* (2006.01)
  *F01M 13/04* (2006.01)
  *B01D 45/08* (2006.01)
  *B04B 5/08* (2006.01)

(52) U.S. Cl.
  CPC ............... *B04B 5/12* (2013.01); *B04B 9/06* (2013.01); *F01M 13/04* (2013.01); *F01M 2013/0422* (2013.01); *F01M 2013/0494* (2013.01)

(58) Field of Classification Search
  CPC ..... B04B 5/005; B04B 2005/125; B04B 1/08; F01M 13/04; F01M 2013/0494; F01M 2013/0422
  See application file for complete search history.

(56) References Cited

U.S. PATENT DOCUMENTS

| | | | | |
|---|---|---|---|---|
| 5,405,307 | A * | 4/1995 | Borgstrom | B04B 1/08 494/57 |
| 5,518,494 | A * | 5/1996 | Borgstrom | B04B 1/08 494/56 |
| 5,709,643 | A * | 1/1998 | Borgstrom | B04B 1/14 494/56 |
| 5,720,705 | A * | 2/1998 | Inge | B04B 7/14 494/37 |
| 5,735,789 | A * | 4/1998 | Borgstrom | B04B 1/08 494/70 |
| 5,779,619 | A * | 7/1998 | Borgstrom | B04B 11/082 494/56 |
| 5,788,622 | A * | 8/1998 | Borgstrom | B04B 11/082 494/57 |
| 6,080,098 | A * | 6/2000 | Borgstrom | B04B 1/08 494/27 |
| 6,821,319 | B1 * | 11/2004 | Moberg | B01D 45/14 95/270 |
| 7,022,163 | B2 * | 4/2006 | Olsson | B01D 45/14 95/268 |
| 7,152,589 | B2 | 12/2006 | Ekeroth et al. | |
| 7,396,373 | B2 * | 7/2008 | Lagerstedt | B04B 5/12 55/337 |
| 7,465,341 | B2 | 12/2008 | Eliasson | |
| 8,191,537 | B1 * | 6/2012 | Moy | F01M 13/04 123/572 |
| 8,794,222 | B2 * | 8/2014 | Schwandt | F01M 13/04 123/573 |
| 9,031,768 | B2 * | 5/2015 | Lagerlof | B01D 45/14 701/114 |
| 2004/0025482 | A1 * | 2/2004 | Borgstrom | B04B 5/005 55/438 |
| 2004/0040442 | A1 * | 3/2004 | Franzen | B01D 45/14 95/270 |
| 2005/0198932 | A1 * | 9/2005 | Franzen | B01D 45/14 55/406 |
| 2006/0157406 | A1 * | 7/2006 | Maier | B01D 17/0217 210/512.1 |
| 2007/0163444 | A1 | 7/2007 | Eliasson | |
| 2007/0295364 | A1 * | 12/2007 | Lagerstedt | B04B 5/12 134/22.18 |
| 2008/0264251 | A1 * | 10/2008 | Szepessy | B01D 45/14 95/35 |
| 2008/0308480 | A1 * | 12/2008 | Lagerstedt | B01D 45/14 210/225 |
| 2009/0266231 | A1 * | 10/2009 | Franzen | B01D 45/14 95/68 |
| 2009/0298666 | A1 * | 12/2009 | Trager | B04B 1/08 494/10 |
| 2011/0240384 | A1 * | 10/2011 | Roske | B60K 6/38 180/65.22 |
| 2013/0037493 | A1 * | 2/2013 | Konigsson | B01D 21/262 210/787 |
| 2013/0056407 | A1 * | 3/2013 | Parikh | F01M 13/04 210/360.1 |
| 2014/0018227 | A1 * | 1/2014 | Andersson Aginger | B04B 5/005 494/43 |
| 2014/0230381 | A1 * | 8/2014 | Tornblom | B04B 5/12 55/317 |
| 2014/0237963 | A1 * | 8/2014 | Inge | B04B 5/12 55/443 |
| 2014/0305304 | A1 * | 10/2014 | Yokoi | B01D 45/08 96/1 |
| 2015/0149098 | A1 * | 5/2015 | Daugela | G01F 1/00 702/45 |
| 2016/0030875 | A1 * | 2/2016 | Parikh | B01D 46/2403 55/403 |
| 2016/0361727 | A1 * | 12/2016 | Konigsson | B04B 11/02 |
| 2017/0218803 | A1 * | 8/2017 | Grover | F01M 13/04 |
| 2018/0147515 | A1 * | 5/2018 | Erdmann | B01D 45/14 |

FOREIGN PATENT DOCUMENTS

| | | |
|---|---|---|
| DE | 102012213877 A1 | 2/2014 |
| DE | 1020012213877 A1 | 2/2014 |
| WO | 9815723 A1 | 4/1998 |

OTHER PUBLICATIONS

China National Intellectual Property Administration, Notice of First Office Action in Application No. 201680030729.0, dated May 24, 2019, 7 pages.

\* cited by examiner

APPARATUS FOR CLEANING CRANKCASE GASES

TECHNICAL FIELD

The present invention relates to an apparatus for cleaning gases comprising a stationary casing and a centrifugal separator being hydraulically driven by oil, which includes: an oil separation element for cleaning gases from oil particles and solid particles being hydraulically driven by oil and being rotatably supported in the stationary casing; an inlet in the separator for uncleaned gases; an outlet in the separator for cleaned gases; an outlet in the stationary casing for the discharge of particles separated out from the gases, wherein the outlet in the casing may lead to the outside or, for example, a neighbouring chamber; a collection chamber in the casing for the collection of oil used for driving the centrifugal separator; an oil outlet for the collected oil in the bottom of the collection chamber; and an outlet conduit for the discharge of the collected oil from the oil outlet.

BACKGROUND OF THE TECHNOLOGY

Gas cleaning devices are for example employed in order to clean blow-by gases of a combustion engine from oil or solid particles. Since these particles are generally denser than the gas they can be separated from the gas by centrifugal forces in a centrifugal separator. A centrifugal separator can for example be hydraulically driven by a propellant oil exiting a turbine wheel which has substantially tangentially directed outlet nozzles or by a propellant oil hitting a turbine wheel. The propellant oil can subsequently be collected in a collection chamber and be returned to an oil pan of a crankcase from where it may have been pumped to the turbine wheel before.

However, in gas cleaning devices of the above-mentioned type gas in the collection chamber is mixed with the propellant oil from the turbine wheel, so that, when the propellant oil flows down in the outlet conduit, gas bubbles are generated therein which form a larger gas accumulation in the outlet conduit. The more gas being collected in this gas accumulation, the higher the pressure will be therein. The high pressure in the gas accumulation in combination with the low pressure of the propellant oil prevailing in the collection chamber makes it difficult for the oil in the bottom of the collection chamber to flow out through the oil outlet and down through the outlet conduit back to the oil pan of the engine, since the weight of the oil column in the outlet conduit is insufficient for compensating for the pressure acting upwards from the gas accumulation. As a result, the collection chamber is filled up with oil which eventually slows down the turbine wheel therein and thus deteriorates the function of the cleaning apparatus.

SUMMARY OF THE INVENTION

In order to solve this problem it is suggested in accordance with the present invention that a pressure equalizing and gas discharging conduit is provided which extends between the oil conduit and the collection chamber, wherein preferably an upper aperture of the pressure equalizing and gas discharging conduit is located above a liquid level generated during the operation of the centrifugal separator by the oil in the collection chamber. The term liquid level does not restrict the oil in the collection chamber to be a stationary liquid. The oil in the oil chamber can, for example, also be a foaming liquid or a liquid without a stationary surface.

By locating the upper aperture of the pressure equalizing and gas discharging conduit above the liquid level, a substantially equal pressure can be obtained in the gas accumulation in the outlet conduit as in the collection chamber, which allows for the propellant oil to flow down without problem through the outlet conduit by gravity.

Advantageously, the gases are or comprise crankcase gases and/or blow-by gases from a combustion engine. These uncleaned gases are conducted from the engine to the centrifugal separator via the inlet in the separator and may be cleaned, for example, from oil and solid particles, by means of centrifugal forces. The cleaned gases can then be conducted to the engine via the outlet in the separator.

The oil separation element advantageously comprises a rotor that has a plurality of lamella discs stacked one upon another and arranged about a center axis of the rotor. The gas can then be conducted through the rotor in an empty space between the lamella discs. Once the rotor starts to rotate, the gas will also be brought into rotation and will be cleaned from oil droplets or solid particles which can be thrown onto impact plates or a housing surrounding the rotor.

The apparatus for cleaning gases further advantageously comprises a turbine wheel for hydraulically driving the oil separation element and being preferably connected to the center axis for the rotation of the rotor. The turbine wheel can for example be externally driven by oil exercising pressure on the wheel or internally by oil exiting, for example, through nozzles of the wheel. The oil can advantageously be supplied by a supply line for feeding pressurized oil to the turbine wheel as propellant oil, wherein the supply line for the propellant oil is connected to a pump for feeding oil from an oil pan. Accordingly it is not necessary to supply external oil. Further, the outlet conduit can advantageously be a return conduit for the feedback of the propellant oil to the oil pan, wherein an outlet aperture of the return conduit can advantageously be located above but also below or at a liquid level of the oil in the oil pan. If the outlet aperture is located above the liquid level in the oil pan, less pressure is exercised on the oil in the outlet conduit, and the oil can more easily return to the oil pan.

Moreover, the upper aperture of the pressure equalizing and gas discharging conduit can advantageously be located above a maximum of the liquid level generated during the operation of the centrifugal separator by the oil in the collection chamber, such that the liquid level never reaches the upper aperture and such that the gas can accordingly always leave the conduit.

The pressure equalizing and gas discharging conduit further can advantageously comprise a conduit contained within and/or encircled by the outlet conduit and/or be one piece with the outlet conduit which allows for a simple arrangement. In this case the pressure equalizing and gas discharging conduit can be eccentrically contained within and/or encircled by the outlet conduit, preferably in contact with and/or fixed to the wall of the outlet conduit. A centered arrangement, e.g. as a separate part in the outlet conduit is possible, too. Alternatively, the pressure equalizing and gas discharging conduit can be a conduit outside of the outlet conduit. The pressure equalizing and gas discharging conduit can further pass through the oil in the collection chamber perpendicularly with respect to the liquid level of the oil in the collection chamber and can be configured as a straight line connecting the outlet conduit with the upper aperture of the pressure equalizing and gas discharging conduit and being inclined with respect to the outlet conduit.

The axis of the rotor of the apparatus of the present invention can further, for example, be perpendicular or parallel to the liquid level of the oil in the collection chamber.

Moreover the apparatus may comprise an impact separator preceding (in the direction of the gas flow) the centrifugal separator, wherein an outlet of the impact separator is connected to the inlet of the centrifugal separator, such that the impact separator can pre-clean the gases before entering the centrifugal separator.

According to the present invention a cylinder head cover, an oil pan or a front cover can at least partially comprise an apparatus for cleaning gases according to the present invention.

Further, a combustion engine may comprise an apparatus according to the present invention. Moreover, a combustion engine may comprise the cylinder head cover, the oil pan or the front cover which least partially comprises the apparatus for cleaning gases according to the present invention.

The invention is described more in detail below with reference to the accompanying drawings. The same elements are denoted by same reference signs. The description of the same elements in different drawings may be omitted. Further, optional elements of the present invention may improve the present invention even if shown only in combination with other elements.

BRIEF DESCRIPTION OF THE DRAWING FIGURES

FIG. 1 schematically illustrates an apparatus for cleaning gases according to the prior art.

Figure 2:
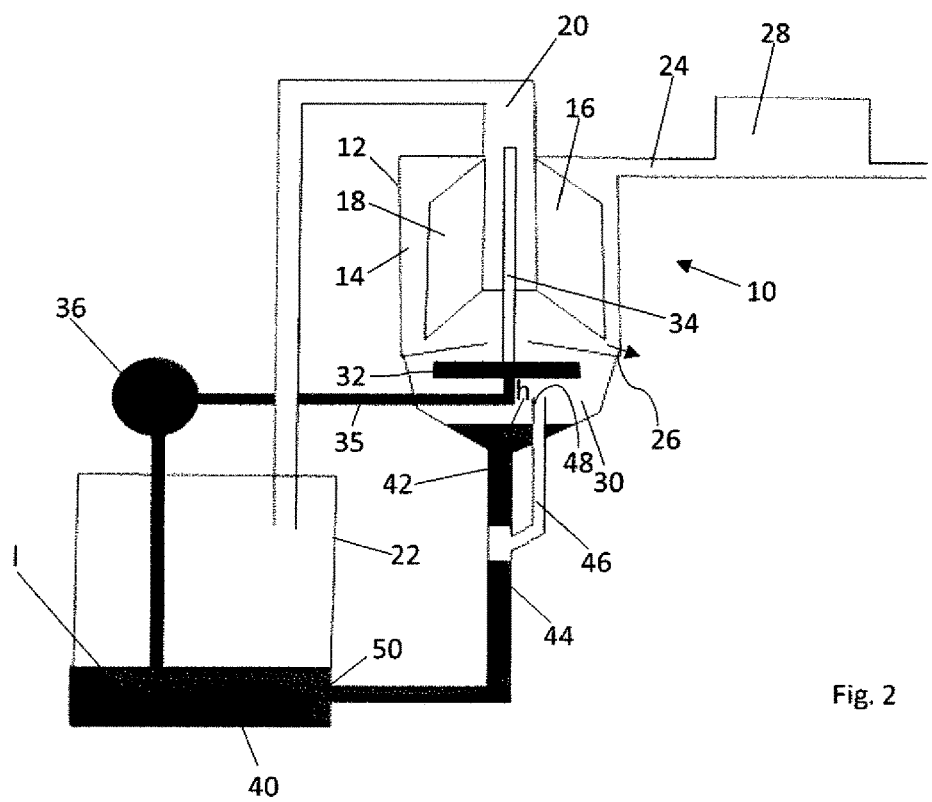

FIG. 2 schematically illustrates a first embodiment of an apparatus for cleaning gases according to the present invention.

Figure 3:
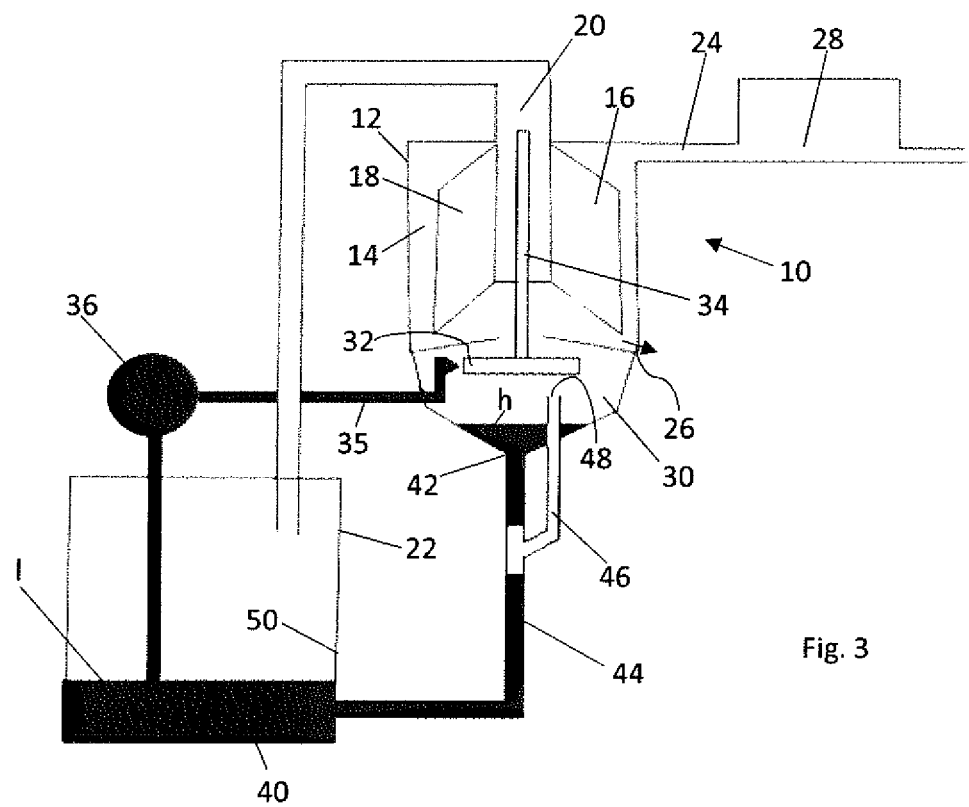

FIG. 3 schematically illustrates a second embodiment of an apparatus according to present invention showing an alternative external drive for the turbine wheel.

Figure 4:
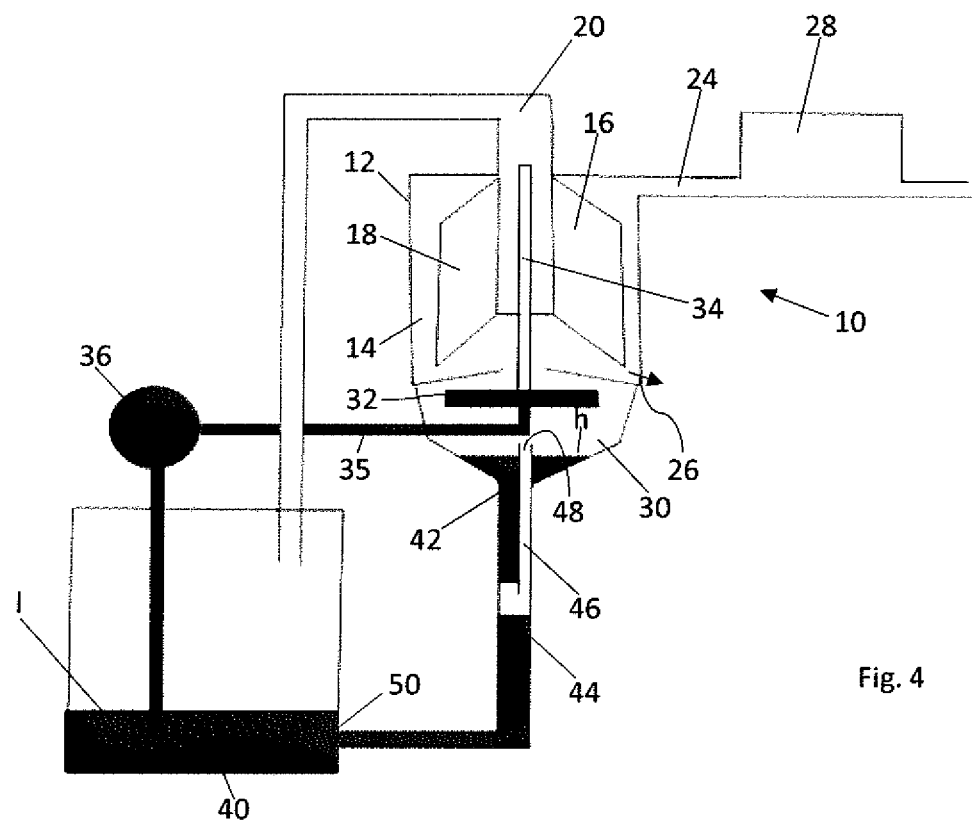

FIG. 4 schematically illustrates a third embodiment of an apparatus according to the present invention, wherein the pressure equalizing and gas discharging conduit is contained within the outlet conduit.

Figure 5:
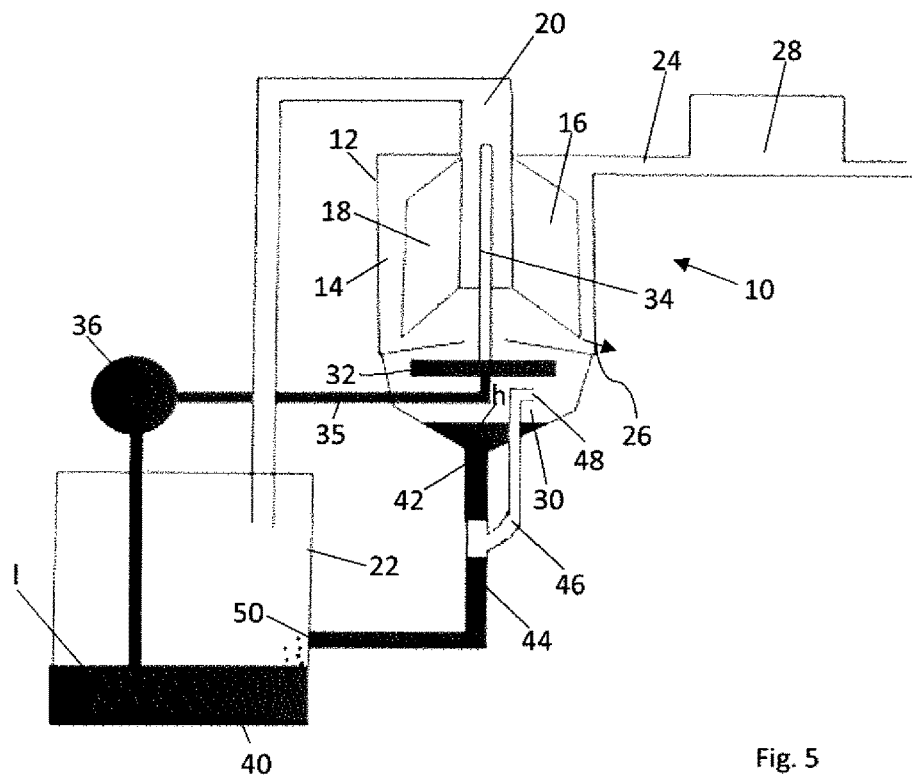

FIG. 5 schematically illustrates a forth embodiment of an apparatus according to the present invention, wherein an outlet aperture of the return conduit is located above a liquid level of the oil in the oil pan.

Figure 6:
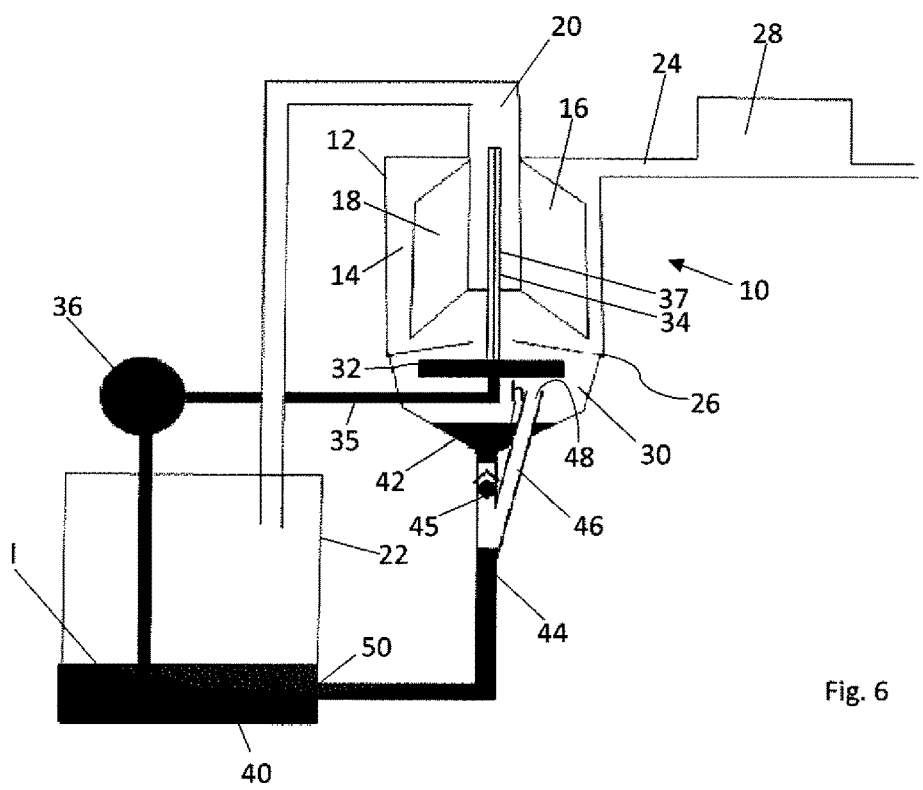

FIG. 6 schematically illustrates a fifth embodiment of an apparatus according to the present invention, further comprising a valve in the outlet conduit.

Figure 7:
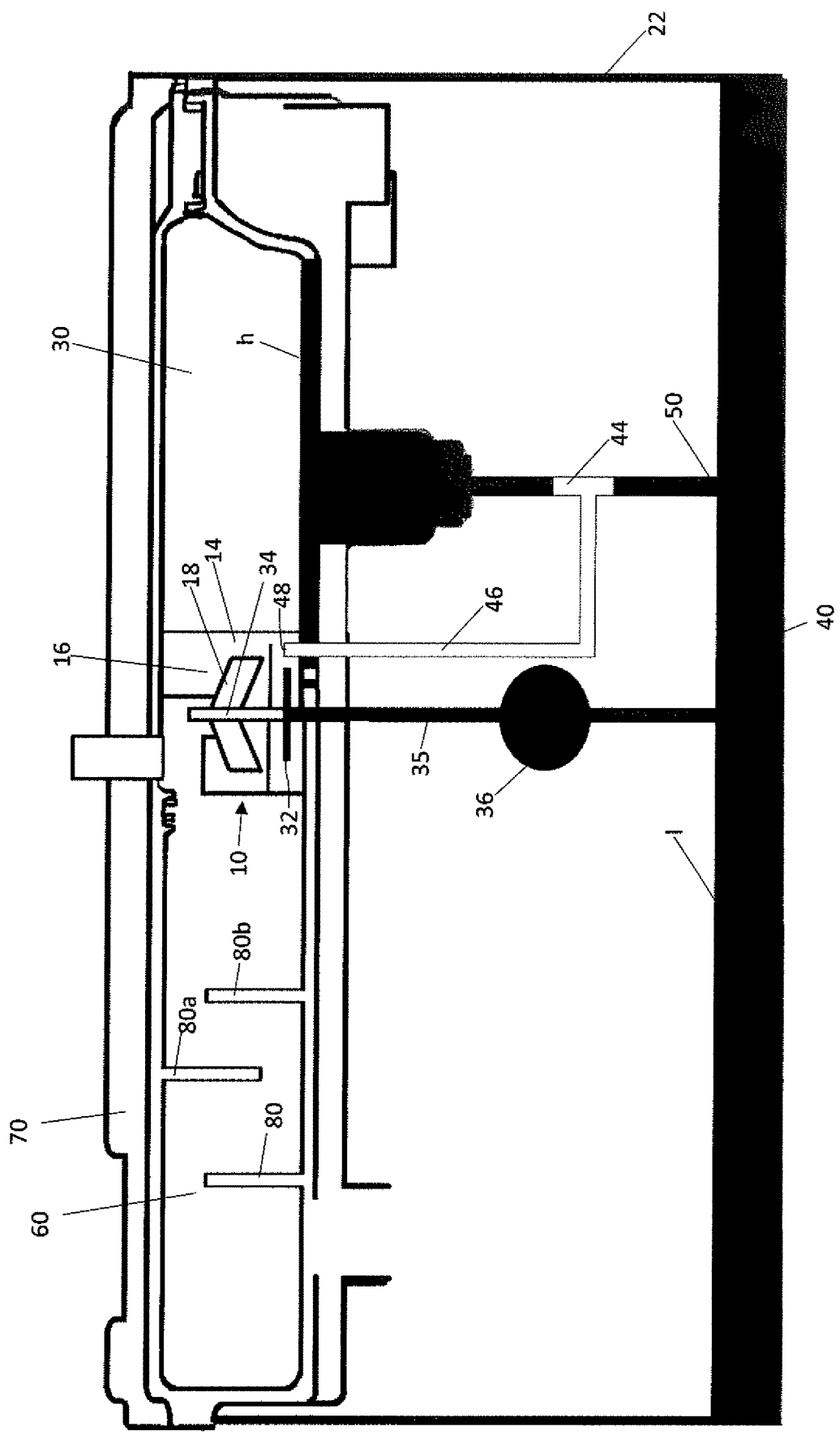

FIG. 7 schematically illustrates a sixth embodiment of a combustion engine according to the present invention.

Figure 8:
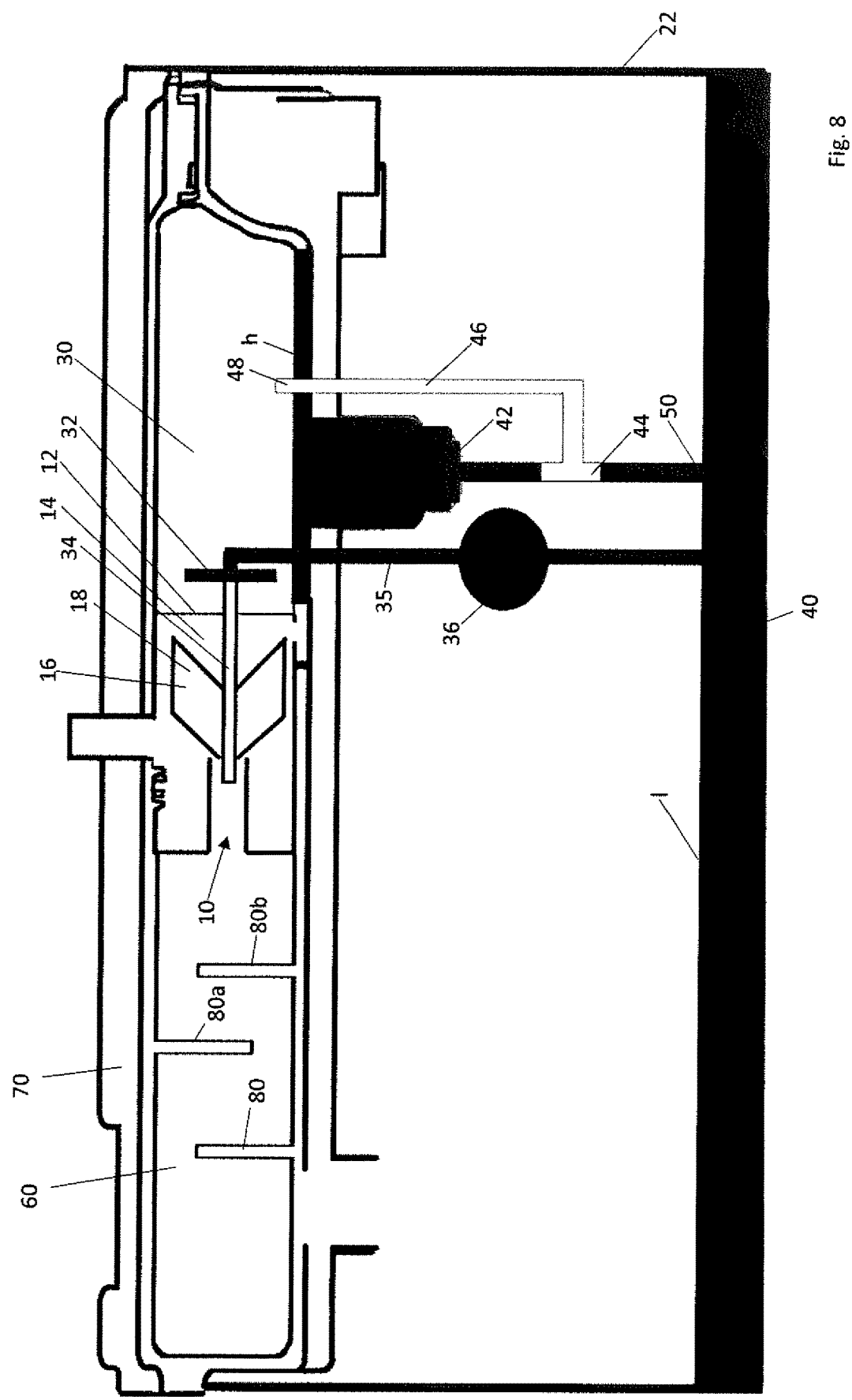

FIG. 8 schematically illustrates a seventh embodiment of a combustion engine according to the present invention.

DETAILED DESCRIPTION OF THE PREFERRED EMBODIMENTS OF THE INVENTION

In FIG. 1 reference sign 10 generally denotes a centrifugal separator comprising an oil separation element 16 for cleaning gases from oil particles and solid particles being hydraulically driven by oil and being rotatably supported in the stationary casing 12. The oil separation element preferably is a rotor-type separation apparatus 16 for centrifugal cleaning of gases, for example crankcase gases from a combustion engine. The centrifugal separator 10 comprises the stationary casing 12 which delimits a separation chamber 14 in which a rotor 16 known per se is rotatable, wherein the rotor 16 supports a plurality of separation discs 18, such as closely separated conical lamellae, stacked upon one another. The casing 12 has an inlet 20 for uncleaned gas, preferably crankcase gas from a crankcase 22 of a combustion engine, an outlet 24 for cleaned gas, preferably crankcase gas cleaned from oil particles and solid particles, and a schematically shown outlet 26 for separated-out particles. This outlet 26 for separated-out particles may lead to the outside of the apparatus or may, for example, also lead to another compartment or chamber. It is thus not restricted to be an outlet 26 conducting the separated particles to an outside of the apparatus for cleaning gases. In the gas outlet 24 there is a pressure control member 28 which is configured to maintain a desired low pressure in the separator 10. Beneath the separation chamber 14 there is a collection chamber 30 for the collection of oil used for driving the centrifugal separator 10. The collection chamber 30 encloses a turbine wheel 32 connected to a drive shaft 34 of the rotor 16. Via a supply conduit 35 the turbine wheel 32 is driven by pressurized oil from an oil pump 36 that pumps oil from the oil pan 40 of the engine. The turbine wheel 32 has substantially tangentially directed outlet nozzles (not shown). Here, the turbine is realized as a Heron-type turbine. Alternatively, one or more stationary nozzles might be used for propelling a Pelton-type turbine.

The collection chamber 30 is an accumulation chamber for the oil, which preferably is propellant oil, for the turbine wheel and has an oil outlet 42 for the collected oil at the bottom of the collection chamber 30. The oil outlet 42 is connected to a return or outlet conduit 44 for the feedback of the propellant oil to the oil pan of the engine.

If air or other gases are carried on with the oil, an air/gas column may accumulate in the outlet conduit 44 as depicted in FIG. 1. This air/gas column may prevent further oil from flowing from the collection chamber 30 to the oil pan 40.

FIG. 2 shows a first embodiment of the present invention with all the elements of the prior art apparatus shown in FIG. 1. In accordance with the present invention, FIG. 2 further shows a pressure equalizing and gas discharging conduit 46 extending from the return and outlet conduit 44 up to the collection chamber 30. At its upper end, this pressure equalizing and gas discharging conduit 46 has an upper aperture 48 therein which is located above the oil level h in the collection chamber 30 during the operation of the centrifugal separator 10. Owing to this pressure equalizing piping 46, air and other gases introduced into the return and outlet conduit 44 can rise towards the collection chamber 30. This way, the accumulation of air and other gases and thus an air/gas column in the outlet conduit 44, is prevented from and the drainage and the feedback of the propellant oil from the collection chamber 30 to the oil pan 40 of the engine is greatly facilitated.

The term oil level h in the collection chamber 30 does not restrict the oil in the collection chamber 30 to be a stationary liquid. The oil in the oil collection chamber 30 can for example also be a foaming liquid or a liquid without a stationary surface.

According to the above described first embodiment, an apparatus for cleaning crankcase gases from a combustion engine may comprise: an hydraulically driven centrifugal separator 10, which includes: a rotor 16 that is rotatably supported in a stationary casing 12 and has a plurality of lamella discs 18 stacked upon one another about the center axis 34 of the rotor 16 for cleaning the crankcase gases from oil particles and solid particles; an inlet 20 in the separator 10 for uncleaned crankcase gases; an outlet 24 in the separator 10 for cleaned crankcase gases; an outlet 26 in the casing 12 for the discharge of particles separated out from crankcase gases; a turbine wheel 32 connected to the rotor shaft 34 for the rotation of the rotor 16; a supply line 35 for feeding pressurized propellant oil to the turbine wheel 32; a chamber 30 in the casing 12 for the collection of propellant oil having passed through the turbine wheel 32; a propellant oil outlet 42 in the bottom of the chamber; and an outlet conduit 44 for the discharge of the propellant oil from the propellant oil outlet 42, characterized by a pressure equalizing and gas discharging conduit 46 which extends between the outlet conduit 44 and the collection chamber 30, an upper aperture 48 of the gas discharging conduit 46 being located above a liquid level h generated during the operation by the oil in the collection chamber 30.

FIG. 3 shows a second embodiment of the present invention. In contrast to the first embodiment shown in FIG. 2, in FIG. 3 the oil pumped by the oil pump 36 is not exiting the turbine wheel 32 through nozzles, but is externally driving the turbine wheel like a Pelton-type turbine, for example by exercising pressure on shovels or paddles. Accordingly, the present invention is not limited to an internal drive of the turbine wheel, but the turbine wheel can also be driven externally.

In both FIG. 2 and FIG. 3 the pressure equalizing and gas discharging conduit 46 is a conduit outside of the outlet conduit 44.

FIG. 4 shows a third embodiment of the present invention. It has the same elements as FIG. 2 and FIG. 3. In contrast to FIG. 2 and FIG. 3, in FIG. 4 the pressure equalizing and gas discharging conduit 46 is a conduit at least partially contained within and encircled by the outlet conduit 44. Moreover, in FIG. 4 the pressure equalizing and gas discharging conduit 46 is (with respect to the center axis of the outlet conduit 44) eccentrically contained within the outlet conduit 44 and it is advantageously in contact with and fixed to the wall of the outlet conduit 44, preferably forming one-piece with the outlet conduit. As an alternative, the pressure equalizing and gas discharging conduit might also be arranged centered with respect to the center axis of the outlet conduit and/or be a separate, installed part.

In FIG. 2 to FIG. 4 an outlet aperture 50 of the outlet conduit 44 opening to the oil pan 40 in the crankcase 22 is located below a liquid level l of the oil in the oil pan 40.

Alternatively it may be preferable that the outlet aperture 50 of the outlet conduit 44 is located above a liquid level l of the oil in the oil pan 40. Accordingly, FIG. 5 which exhibits the same elements as the previous embodiment, shows a fourth embodiment of the present invention, wherein the outlet aperture 50 of the outlet conduit 44 is located above the liquid level l of the oil in the oil pan 40. It is thus more easily possible for the oil to return to the oil pan 40, since the oil in the oil pan 40 cannot exercise pressure on the oil in the outlet conduit 44 and the oil outlet 42.

The term liquid level l of the oil in the oil pan 40 does not restrict the oil in the oil pan 40 to be a stationary liquid. The oil in the oil pan 40 can for example also be a foaming liquid or a liquid without a stationary surface.

In the fourth embodiment given in FIG. 5, the upper end 48 of the pressure equalizing and gas discharging conduit 46 shows no upwardly directed aperture. Instead, the aperture of the upper end 48 points parallel to the liquid level l of the oil in the oil pan 40. This way, it is possible to prevent oil droplets from entering into this gas discharging conduit from above. As an alternative to the horizontal extension of the pressure equalizing and gas discharging conduit 46 at is upper end, e.g. a u-shaped extension would be possible, too.

In FIG. 2 to FIG. 5 the pressure equalizing and gas discharging conduit 46 is passing through the oil in the collection chamber 30 perpendicularly with respect to the liquid level h of the oil in the collection chamber 30 and largely parallel to the outlet conduit 44.

In contrast to this, in a fifth embodiment of the present invention shown in FIG. 6 the pressure equalizing and gas discharging conduit 46 is inclined with respect to the outlet conduit 44. In FIG. 6 the pressure equalizing and gas discharging conduit 46 is a straight connection connecting the outlet conduit 44 with the upper aperture 48 of the pressure equalizing and gas discharging conduit 46 and being inclined with respect to the outlet conduit 44, for example, by approximately 15°. Preferable values for this inclination are 5° to 45°, preferably 10° to 25°.

Further, the apparatus according to the fifth embodiment shown in FIG. 6 comprises an optional valve 45 in the oil outlet conduit 44 arranged above the branch-off of the pressure equalizing and gas discharging conduit 46 from the oil outlet conduit 44. This valve 45 prevents from oil flowing back from the oil pan 40 to the collection chamber 30. It is situated in such a position that a removal of air/gas from the oil is nevertheless possible. An arrangement below the branching of the gas discharging conduit 46 would be possible as well.

In FIG. 6, an oil supply line 37 is comprised in the rotor axis 34. This thin oil supply line 37 may be used for the lubrication of a bearing (not shown here) at the upper end of the axis 34. Further, FIG. 6 explicitly shows that the separated particles here are collected in the collection chamber 30, as the outlet 26 in the casing opens towards the collection chamber 30.

FIG. 7 schematically illustrates a combustion engine according to a sixth embodiment of the present invention. In FIG. 7 a cylinder head cover 70 of the combustion engine is arranged above the crankcase 22. The cylinder head cover 70 comprises the centrifugal separator 10 according to the previous first to fifth embodiments which is arranged to the left besides a collection chamber 30 for the propellant oil. The outlet conduit 44 from the collection chamber leads straight downwards to the oil pan 40 of the crankcase 22 being arranged below the cylinder head cover 70. The supply line 35 leads straight upwards from the oil pan 40 via the pump 36 to the turbine wheel 32 being in line with the rotor axis 34. Further to the left from the centrifugal separator 10, the cylinder head cover 70 further comprises an impact separator 60. This impact separator 60 comprises three plates 80 alternately projecting inwards from the casing from the top and from the bottom, i.e. the second plate 80a for example projects inwards from the top thus representing a barrier for the gases. The gases accordingly have to bypass the plate 80a at a passage located at the lower part of the impact separator 60. Since the passages are alternately at the lower and the upper part of the separator 60 the gases have to change direction which can lead to inertial forces. This can allow for cleaning of the gases from oil and/or solid particles. Subsequent to the impact separator 60 the gases can then be introduced to the centrifugal separator 10 for additional cleaning. Further, the pressure equalizing and gas discharging conduit 46 according to the sixth embodiment as in the previous embodiments is a connection connecting the outlet conduit 44 with the upper aperture 48 of the pressure equalizing and gas discharging conduit 46, for example, in two straight conduit elements having a right angle with respect to each other as shown in FIG. 7. The aperture 48 of the pressure equalizing and gas discharging conduit 46 is located above the level h of oil in the collection chamber 30.

FIG. 8 schematically illustrates a combustion engine according to a seventh embodiment of the present invention. The combustion engine of FIG. 8 according to the seventh embodiment is different from that in FIG. 7 according to the sixth embodiment in that the axis 34 of the rotor 16 in FIG. 8 is not perpendicular as in FIG. 7 but parallel to the liquid level h of the oil in the collection chamber 30 (at normal position of the collection chamber 30). It is thus parallel to the plane in which the covering portion of the cylinder head cover 70 is arranged. That is, the turbine wheel 32 and the rotor 16 of the centrifugal separator 10 are turning around a horizontal axis 34. Accordingly, the supply line 35 for the turbine wheel 32 exhibits a turn by a right angle, contained in the collection chamber 30, in the way upwards from the pump 36 turning to the horizontal axis 34 of rotation.

REFERENCE SIGN LIST

10 Centrifugal separator
12 Casing/housing
14 Separation chamber
16 Rotor
18 Laminar/separation discs
20 Inlet into the separator
22 Crankcase
24 Outlet from the separator
26 Outlet in the casing
28 Pressure regulation/control device
30 Collection chamber for driving oil
32 Turbine wheel/rotor
34 Rotor shaft/axis
35 Inlet for driving oil
36 Pump
37 Lubricant supply in axis
40 Oil pan
42 Oil outlet
44 Outlet/return conduit
45 Valve
46 Pressure equalizing and gas discharging conduit
48 Upper aperture of the pressure equalizing and gas discharging conduit
50 Oil outlet aperture
60 Impact separator
70 Cylinder head cover
80 Impact plates
80a Second impact plate
h Liquid level generated during the operation of the centrifugal separator by the oil in the collection chamber
l Liquid level of the oil in the oil pan

The invention claimed is:

1. An apparatus for cleaning gases comprising a stationary casing and a centrifugal separator being hydraulically driven by oil, which includes:
   an oil separation element for cleaning gases from oil particles and solid particles being hydraulically driven by oil and being rotatably supported in the stationary casing;
   an inlet in the separator for uncleaned gases;
   an outlet in the separator for cleaned gases;
   an outlet in the stationary casing for the discharge of particles separated out from the gases;
   a collection chamber in the casing for the collection of oil used for driving the centrifugal separator;
   an oil outlet for the collected oil in the bottom of the collection chamber;
   and an outlet conduit for the discharge of the collected oil from the oil outlet, and
   a pressure equalizing and gas discharging conduit which extends between the oil conduit and the collection chamber, an upper aperture of the pressure equalizing and gas discharging conduit always being located above a liquid level generated during the operation of the centrifugal separator by the oil in the collection chamber.

2. The apparatus according to claim 1, wherein the gases comprise crankcase gases and/or blow-by-gases from a combustion engine.

3. The apparatus according to claim 1, wherein the upper aperture of the pressure equalizing and gas discharging conduit is located above a maximum of the liquid level generated during the operation of the centrifugal separator by the oil in the collection chamber.

4. The apparatus according to claim 1, wherein the pressure equalizing and gas discharging conduit is a conduit contained within the outlet conduit.

5. The apparatus according to claim 1, wherein the pressure equalizing and gas discharging conduit is a conduit encircled by the outlet conduit.

6. The apparatus according to claim 1, wherein the pressure equalizing and gas discharging conduit is one piece with the outlet conduit.

7. The apparatus according to claim 1, wherein the pressure equalizing and gas discharging conduit is in contact with the outlet conduit.

8. The apparatus according to claim 1, wherein the pressure equalizing and gas discharging conduit is a conduit outside of the outlet conduit.

9. The apparatus according to claim 1, wherein the pressure equalizing and gas discharging conduit is passing at least partially through the oil in the collection chamber perpendicularly with respect to the liquid level of the oil in the collection chamber.

10. The apparatus according to claim 1, wherein the pressure equalizing and gas discharging conduit is a straight connection connecting the outlet conduit with the upper aperture of the pressure equalizing and gas discharging conduit and being inclined with respect to the outlet conduit.

11. The apparatus according to claim 1, further comprising an impact separator preceding the centrifugal separator, wherein an outlet of the impact separator is connected to the inlet of the centrifugal separator.

12. The apparatus according to claim 1, wherein the oil separation element comprises a rotor that has a plurality of lamella discs stacked upon one another about a center axis of the rotor.

13. The apparatus according to claim 12, further comprising a turbine wheel for hydraulically driving the oil separation element and being preferably connected to the center axis for the rotation of the rotor.

14. The apparatus according to claim 13, further comprising a supply line for feeding pressurized oil to the turbine wheel as propellant oil.

15. The apparatus according to claim 14, wherein the supply line for the propellant oil is connected to a pump for feeding oil from an oil pan.

16. The apparatus according to claim 15, wherein the outlet conduit is a return conduit for the feedback of the propellant oil to the pan.

17. The apparatus according to claim 16, wherein an outlet aperture of the return conduit is located above or below or at a liquid level of the oil in the oil pan.

18. The apparatus according to claim 12, wherein the axis of the rotor is parallel to the liquid level of the oil in the collection chamber.

19. The apparatus according to 12, wherein the axis of the rotor is orthogonal to the liquid level of the oil in the collection chamber.

* * * * *